(12) United States Patent
Yamaguchi et al.

(10) Patent No.: US 6,682,577 B2
(45) Date of Patent: Jan. 27, 2004

(54) SOIL MODIFIER

(75) Inventors: Yasuyuki Yamaguchi, Okayama (JP);
Takuya Tsubota, Okayama (JP);
Yutaka Yamauchi, Okayama (JP);
Ryoichi Nagata, Okayama (JP)

(73) Assignee: JFE Steel Corporation, Tokyo (JP)

( * ) Notice: Subject to any disclaimer, the term of this patent is extended or adjusted under 35 U.S.C. 154(b) by 254 days.

(21) Appl. No.: 09/985,035

(22) Filed: Nov. 1, 2001

(65) Prior Publication Data

US 2002/0082308 A1 Jun. 27, 2002

(30) Foreign Application Priority Data

Nov. 2, 2000 (JP) ........................................ 2000-335357

(51) Int. Cl.⁷ ................ C05F 5/00; C05F 9/00
(52) U.S. Cl. .................... 71/11; 71/14; 71/25
(58) Field of Search ................. 71/11, 14, 25

(56) References Cited

U.S. PATENT DOCUMENTS 3,861,332 A * 1/1975 Itsaka et al. ............ 110/8 C
4,826,573 A * 5/1989 Schippers .................. 201/6

FOREIGN PATENT DOCUMENTS

| JP | 57139190 | * | 8/1982 |
| JP | 2981399 | * | 6/1994 |
| JP | 09038614 | * | 2/1997 |
| JP | 2865541 | * | 3/1999 |
| JP | 2000088227 | * | 3/2000 |

* cited by examiner

Primary Examiner—Chhaya Sayala
(74) Attorney, Agent, or Firm—Young & Thompson

(57) ABSTRACT

The soil modifier includes a porous material obtained by dry distillation of refuse-derived fuel to pioneer a cheap way for effectively utilizing the refuse, thereby enabling the environment to be improved by modification of soil while promoting environment preserving disposal of the refuse. The porous material includes carbon, nitrogen, sulfur, phosphorus, potassium, and zinc.

12 Claims, No Drawings

SOIL MODIFIER

BACKGROUND OF THE INVENTION

1. Field of the Invention

The present invention relates to a soil modifier produced from a solid fuel, or from a so-called refuse-derived fuel (RDF), obtained by molding refuse after crushing and drying.

2. Description of the Related Art

Various technologies for refuse disposal and recycling have been developed in recent years, whereby flammable refuse is picked up from wastes and recovered followed by crushing, drying and molding to form a solid fuel. Such technologies are disclosed, for example, in Japanese Patent Nos. 2,865,541 and 2,981,399, and Japanese Unexamined Patent Application Publication No. 8-86569.

In these technologies, urban trash, domestic garbage, industrial waste and other refuses are crushed and dried for reducing the moisture content, followed by a selection process for removing glasses and ceramics. Then, the processed refuse is molded into a prescribed shape, for example a crayon shape, to reuse as the solid fuel. Such solid fuel from refuse is called RDF.

While solid fuel from refuse has been utilized as heat sources for air conditioning of various facilities or for power plant fuels, additional investments for installation of new equipment suitable for refuse-derived fuel, or for repair of existing equipment are required for utilizing the solid fuel. Since the amount of refuse generated is increasing day by day, it is desirable from the view point of environmental protection to increase production of the refuse-derived fuel.

However, it is meaningless to merely increase the production of refuse-derived fuel under the current situation where installation of facilities for practically utilizing refuse-derived fuel is insufficient.

SUMMARY OF THE INVENTION

Accordingly, it is an object of the present invention to facilitate consumption of refuse-derived fuel by exploring new fields for practically utilizing the refuse-derived fuel. Specifically, the present invention proposes methods for utilizing solid refuse from the view point of environmental protection.

The inventors of the present invention have investigated the method for utilizing refuse-derived fuel so as to be useful for improving the environment, and have had an idea to use it as soil modifiers. The inventors have intensively studied another method for allowing refuse-derived fuel created by environmentally protective refuse disposal process to contribute to modification of the soil, and found that porous materials obtained by dry distillation of the refuse-derived fuel is suitable as the soil modifier. The present invention is able to largely contribute for carrying out safe and ideal recycling for returning resources into the nature.

The present invention provides a soil modifier comprising porous materials obtained by dry distillation of refuse-derived fuel.

The porous material constituting the soil modifier preferably contains carbon, nitrogen, sulfur, phosphorus, potassium and zinc. More preferably, the carbon content is 30 to 70 mass %. The porous material in one of the preferable embodiments contains 10 mass % or less of nitrogen, 1 mass % or less of sulfur, 10 mass % or less of phosphorus, 10 mass % or less of potassium and 1 mass % or less of zinc. The porous material satisfying both compositions, or comprising 30 to 70 mass % of carbon, 10 mass % or less of nitrogen, 1 mass % or less of sulfur, 10 mass % or less of phosphorus, 10 mass % or less of potassium and 1 mass % or less of zinc, is particularly preferable.

Any of the soil modifiers above preferably comprise 50% or more of the porous materials having a particle diameter of 0.5 to 5.0 mm.

Any of the soil modifiers above preferably comprise the porous materials having a specific surface area of 25 to 500 $m^2/g$.

The porous material is preferably washed with water in any of the soil modifiers described above.

Any of the soil modifiers described above comprise the porous materials having a particle diameter of 0.1 to 50.0 mm.

DESCRIPTION OF THE PREFERRED EMBODIMENTS

The present invention will be described hereinafter in detail.

The soil modifier according to the present invention is produced from a solid fuel processed into a prescribed shape after crushing, drying and molding of refuse, or a so-called RDF, as a starting material. The present invention utilizes a porous material obtained by dry distillation of refuse-derived fuel as a soil modifier. Accordingly, the soil modifier according to the present invention contains nitrogen, sulfur, phosphorus, potassium and zinc as well as carbon originating from refuse.

A porous powder is obtained by dry distillation of refuse-derived fuel comprising common refuse such as urban trash, domestic garbage and office trash, as well as plant and animal residues and industrial wastes such as refuse plastics, paper, woods and fabrics, and sludge and refuse oils or other wastes comprising a mixture thereof. The inventors of the present invention found that physical properties of a soil such as moisture retention, fertilizer retention and water permeation are improved by mixing the porous material in the soil. It was also noticed from the studies of dry distillation conditions of the RDF and compositions of the porous material that RDF is most suitable for the soil modifier because the porous material contains three elements of the fertilizer of nitrogen, phosphorus and potassium, as well as calcium and zinc that serve as nutritious elements for the plants, as shown in Table 1. More advantageously, the soil is activated and improved to be suitable for growth of the plant by spreading the porous material as a result of proliferation of bacteria in the fine pores of the porous materials. Consequently, the inventors of the present invention have started the development for applying the porous material obtained by dry distillation of refuse-derived fuel to the soil modifier, and finally attained the present invention.

Typical examples of the soil modifier include use of charcoals and compost derived from common refuse. However, the charcoal is disadvantageous for use as the soil modifier since forest resources may be depleted by consuming trees, in addition to very high cost for using a large quantity of the charcoal as the soil modifier because production of the charcoal is expensive and it is required to be granulated before use. The compost of the refuse also involves, on the other hand, many problems that it is liable to give out bad smell, and it requires a long period of time for fermentation with anxieties of resumption of fermentation thereafter to make it difficult to handle the compost of the refuse.

The production cost of the soil modifier taking advantage of the porous material obtained by dry distillation of refuse-derived fuel is, on the contrary, very cheap since various wastes may be used as starting materials. A powder or granules mainly comprising carbon are obtained by removing volatile components by dry distillation, and carbon substances obtained therefrom are converted into porous materials during dry distillation. Accordingly, the product is most suitable for the soil modifier that can be easily handled.

The porous material to be used for the soil modifier in the present invention preferably contains 30 to 70 mass % of carbon. In other words, the porous material obtained by dry distillation has a sufficient specific surface area when the carbon content is 30 mass % or more. Bacteria can advantageously proliferate in the pores that sufficiently manifest a moisture retaining effect or, on the contrary, water permeating effect. Retention of fertilizer components is also excellent when the porous material is used by mixing with the fertilizer. The specific surface area is prevented from decreasing due to insufficient dry distillation by allowing refuse-derived fuel to contain 70 mass % or less, preferably 60 mass % or less, of carbon.

The porous material containing an appropriate amount of carbon may manifest an effect as the soil modifier by functioning as an adsorbent for moisture and fertilizer components and as a buffer material in the soil as hitherto described.

Similarly, the porous material contains 10 mass % or less of nitrogen, 1 mass % or less of sulfur, 10 mass % or less of phosphorus, 10 mass % or less of potassium and 1 mass % or less of zinc in a preferable embodiment.

It is usually preferable that the soil modifier contain elements required for the plants. Examples of such elements include nitrogen, sulfur, phosphorus and potassium as major elements, and zinc as a trace element.

The contents of these valuable elements are controllable by properly selecting mixing ratios of common refuse such as urban trash, domestic garbage and office trash, and picked out industrial waste. While it is advantageous as the soil modifier to contain the elements essential for the plants, a sufficient quantity of the essential elements for growth of the plants is not necessarily required to be ensured by the soil modifier alone. Otherwise, the quantities of the essential elements may be controlled by additional fertilizers in the soil modifier, or using the soil modifier as an admixture with the fertilizer. Accordingly, it is crucial for the soil modifier that it is cheaply supplied, rather than it contain a large quantity of plant growth elements.

For example, the quantity of nitrogen required for growth of plants is usually 20 to 30 kg per 10 a (acre). Practically, a standard content of nitrogen is about 10 kg per 10 a for rice, and about 20 to 30 kg per 10 a for vegetables. The content is about 200 kg per 10 a at the largest. Accordingly, a content of nitrogen in the soil modifier of 10 mass % or less is sufficient when the soil modifier is used in a proportion of 1 mass % in the soil, with the proviso that the weight of the soil in the 10 a cultivated area with a depth of 10 cm is 200 tons assuming that the specific gravity of the surface soil is 2. However, since nitrogen is a valuable element for growth of plants, the soil modifier preferably contains 0.2 mass % or more of nitrogen.

Sulfur is also a valuable element for soil modification. However, since sulfur is not contained in the refuse picked up from common refuse and industrial waste, it is difficult to allow the soil modifier manufactured from the refuse or waste to contain a large quantity of sulfur. However, since so much amount of sulfur is not required as a component of the fertilizer in the soil, a sufficient content of sulfur in the soil modifier is 1 mass % or less. The preferable contents of phosphorus and potassium are 10 mass %, respectively, for the same reason as described above. Preferably, the soil modifier contains 0.02 mass % or more of sulfur, 0.2 mass % or more of phosphorus and 0.2 mass % or more of potassium.

The content of zinc as a trace element is preferably 1 mass % or less in order to prevent adverse effects of zinc. Preferably, the soil modifier contains 0.02 mass % or more of zinc.

The content of each element may be adjusted by selection or individual use of the wastes. Since the ingredients of urban trash and domestic garbage vary depending on their day of issue, the content of an element may be controlled by appropriately mixing different porous materials obtained by dry distillation of the refuse-derived fuel.

The porous material obtained in the present invention may be used for the solid modifier without additional processing in most cases. However, it is favorable that at least 50% of the porous material comprising the soil modifier has a diameter of 0.5 to 5.0 mm, in order to prevent the soil modifier from flowing out of the soil and to allow the soil modifier to be properly dispersed in the soil.

The porous material constituting the soil modifier according to the present invention advantageously has a specific surface area of 25 to 500 $m^2/g$, in order to enhance improving effects for moisture retention, fertilizer retention and water permeability. It is also economically advantageous that the specific surface area is 500 $m^2/g$ or less since the effects above are not saturated and increase of the production cost may be suppressed. An activation treatment may be applied during or after the dry distillation for increasing the specific surface area of the porous material. Such activation treatment allows the degree of porosity to be improved because the soil modifier according to the present invention mainly comprises carbon.

Chlorine is sometimes contained in the porous material obtained from common refuse as shown in the composition of the porous material obtained by dry distillation of the refuse-derived fuel. Although such porous material may be used as the soil modifier without any additional processing, chlorine can be readily removed by washing the porous material with water since chlorine is derived from salts such as sodium chloride. Eliminating chlorine permits the porous material to be used as a soil modifier capable of preventing harmful effects of the salts from occurring.

The soil modifier according to the present invention as hitherto described has preferably a particle diameter of 0.1 to 50.0 mm. A particle size of 0.1 mm or more can prevent the soil modifier from readily flowing out of the soil by, for example, rainfall, and the soil modifier is easily dispersed in the soil. The soil modifier is also prevented from being scattered by wind during dispersion in the soil. A diameter of 50.0 mm or less allows, on the other hand, the soil modifier to be so effectively dispersed in the soil that a small amount of the soil modifier is needed.

Control of the particle diameter of the soil modifier according to the present invention may become simple by controlling the particle diameter of the porous material constituting the soil modifier. For example, the porous material is prepared by allowing the porous material to pass through a sieve to remove the particles with a particle size of less than 0.1 mm, or favorable particles are formed by granulating the porous material having a particle diameter of less than 0.1 mm.

Since the soil modifier is used by dispersing in the soil, it is essential that the soil modifier does not contain pollutants for the environment. Therefore, the content of the following harmful substances was investigated in accordance with the Notice of the Environment Agency No. 46, 1991. However, no harmful substances listed therein were detected, and it was confirmed that the product according to the present invention guarantees safety as the soil modifier. (Object of investigation as harmful substances per Notice of the Environment Agency No. 46): mercury alkylate, total mercury, cadmium, lead, organic phosphorus, six-valent chromium, arsenic, total cyanide, PCB, trichloroethylene, tetrachloroethylene, dichloromethane, carbon tetrachloride, 1,2-dichloroethane, 1,1-dichloroethylene, cis-1,2-dichloroethylene, 1,1,1-trichloroethane, 1,1,2- trichloroethane, 1,3-dicyclopropene, thiuram, thiobencarb, benzene and selenium.

The production process of the soil modifier according to the present invention will be described hereinafter in detail.

Metals, glasses and ceramics are removed from the refuse such as a shredder dust obtained by crushing common wastes such as urban trash and domestic garbage, industrial waste, common refuse, home electronic appliances and automobile parts. Then, the refuse mainly comprising flammable substances is crushed, and is dried using, for example, steam as a heat source. After crushing the dried refuse again, it is molded in a prescribed shape to produce a refuse-derived fuel after removing metals, if necessary.

Subsequently, the refuse is subjected to dry distillation. In the dry distillation process, the oxygen concentration in the dry distillation furnace is controlled to be 1 vol % or less by adjusting the amount of the feed air in the furnace, and the dry distillation temperature is controlled to be 600° C. or more, preferably 800° C. or more. The carbon-enriched powder obtained is used for the soil modifier.

The dry distillation gas generated in the dry distillation process is perfectly burnt in an incinerator provided at the side of the dry distillation furnace. The incineration exhaust gas at a temperature of 1000° C. or more generated in the incinerator is allowed to stay in a temperature range of 800° C. or more for two seconds or more followed by rapid cooling, thereby certainly preventing dioxins from generating.

EXAMPLE

The porous material was produced by dry distillation of the refuse-derived fuel at an atmospheric temperature of 600° C. with an oxygen concentration in the furnace of 1 vol %. The particle diameter distribution of the porous material obtained by dry distillation of the refuse-derived fuel was measured, and the results are shown in Table 2. As shown in Table 2, the contents of fine particles with a diameter of less than 0.062 mm and coarse particles with a diameter of more than 5 mm in the porous material were about 5 to 7%, respectively, and the major part of the porous material contained a powder comprising particles with a diameter of 0.062 to 5 mm. The properties of this porous material studied are listed in Table 3.

The porous material obtained as described above was used for the soil modifier, and was mixed with sample soils in various proportions. Oaks were planted in these sample soils, and growth of the trees was evaluated by the weight of the trees after the sixth month. Commercially available charcoals were also evaluated for the growth of the trees. These results are shown in Table 4. The relative production cost of the soil modifier according to the present invention was estimated to be about 30 assuming that the relative production cost of the charcoal is 100.

Spinach was also seeded on the sample soils prepared as described above, and growth of the vegetable was evaluated by its weight after 60 days cultivation. The results are shown in Table 5.

The results in Tables 4 and 5 show that the soil modifier according to the present invention has almost the same degree of soil modification effect as that of the conventionally used expensive charcoal.

The present invention has pioneered a way for utilizing the porous material obtained by dry distillation of the refuse-derived fuel as the soil modifier, thereby enabling the environment to be improved by effectively utilizing by-products of the refuse while promoting environment preserving disposal of the refuse. Accordingly, the present invention can greatly contribute for realizing an ideal recycling of natural resources.

TABLE 1

| | | | | | | | | Ash (mass %) | | | | |
|---|---|---|---|---|---|---|---|---|---|---|---|---|
| C | N | S | P | K | Zn | Na | Cl | $SiO_2$ | $Al_2O_3$ | CaO | MgO | OTHERS |
| 50.0 | 1.5 | 0.2 | 1.3 | 1.1 | 0.1 | 1.7 | 2.8 | 15.0 | 8.7 | 9.4 | 1.3 | 6.9 |

TABLE 2

| PARTICLE DIAMETER (mm) | LESS THAN 0.062 | 0.062 TO LESS THAN 0.5 | 0.5 TO 5.0 | OVER 5.0 |
|---|---|---|---|---|
| CONSTITUTION RATIO (%) | 6.9 | 30.8 | 57.2 | 5.1 |

TABLE 3

| | SOIL MODIFIER FROM REFUSED-DERIVED FUEL (EXAMPLE OF THIS INVENTION) |
|---|---|
| MEAN PARTICLE SIZE (mm) | 1.6 |
| SPECIFIC SURFACE AREA ($m^2/g$) | 144 |
| MAIN uz,3/10 COMPONENT | |
| C (mass %) | 55.2 |
| N (mass %) | 1.7 |
| S (mass %) | 0.2 |
| P (mass %) | 1.3 |
| K (mass %) | 1.3 |
| Zn (mass %) | 0.1 |

TABLE 4

| MIXED AMOUNT OF SOIL MODIFIER | TREE WEIGHT WHEN PLANTED | TREE WEIGHT AFTER THE 6TH MONTH | WEIGHT IN-CREMENT RATIO |
|---|---|---|---|
| NONE-ADDED SAMPLE EXAMPLE OF THIS INVENTION | 1.2 kg | 1.3 kg | 8% |
| 5% ADDITION | 1.2 kg | 1.4 kg | 16% |
| 10% ADDITION | 1.1 kg | 1.3 kg | 18% |
| COMPARATIVE EXAMPLE | | | |
| 5% ADDITION | 1.3 kg | 1.5 kg | 15% |
| 10% ADDITION | 1.1 kg | 1.3 kg | 18% |

TABLE 5

| MIXED AMOUNT OF SOIL MODIFIER | WEIGHT IN SAMPLE SOIL 1 | WEIGHT IN SAMPLE SOIL 2 | WEIGHT IN SAMPLE SOIL 3 | MEAN WEIGHT IN SOIL 1 TO 3 | WEIGHT RATIO TO NON-ADDED SAMPLE |
|---|---|---|---|---|---|
| NONE-ADDED SAMPLE | 33 g | 38 g | 34 g | 35 g | 100% |
| EXAMPLE OF THIS INVENTION | | | | | |
| 5% ADDITION | 44 g | 38 g | 43 g | 41 g | 119% |
| 10% ADDITION | 46 g | 40 g | 43 g | 43 g | 122% |
| COMPARATIVE EXAMPLE | | | | | |
| 5% ADDITION | 42 g | 44 g | 45 g | 43 g | 124% |
| 10% ADDITION | 40 g | 44 g | 43 g | 42 g | 120% |

What is claimed is:

1. A soil modifier comprising a porous material obtained by dry distillation of refuse-derived fuel.

2. The soil modifier according to claim 1, wherein the porous material comprises carbon, nitrogen, sulfur, phosphorus, potassium and zinc.

3. The soil modifier according to claim 1, wherein the porous material comprises 30 to 70 mass % of carbon.

4. The soil modifier according to claim 2, wherein the porous material comprises 30 to 70 mass % of carbon.

5. The soil modifier according to claim 2, wherein the porous material comprises 10 mass % or less of nitrogen, 1 mass % or less of sulfur, 10 mass % or less of phosphorus, 10 mass % or less of potassium and 1 mass % or less of zinc.

6. The soil modifier according to claim 4, wherein the porous material comprises 10 mass % or less of nitrogen, 1 mass % or less of sulfur, 10 mass % or less of phosphorus, 10 mass % or less of potassium and 1 mass % or less of zinc.

7. The soil modifier according to claim 5, wherein the porous material comprises 0.2 mass % or more of nitrogen, 0.02 mass % or more of sulfur, 0.2 mass % or more of phosphorus, 0.2 mass % or more of potassium and 0.02 mass % or more of zinc.

8. The soil modifier according to claim 6, wherein the porous material comprises 0.2 mass % or more of nitrogen, 0.02 mass % or more of sulfur, 0.2 mass % or more of phosphorus, 0.2 mass % or more of potassium and 0.02 mass % or more of zinc.

9. The soil modifier according to claim 1, wherein 50% or more of the porous material has a particle diameter of 0.5 to 5.0 mm.

10. The soil modifier according to claim 1, wherein the porous material has a specific surface area of 25 to 500 $m^2/g$.

11. The soil modifier according to claim 1, wherein the porous material is washed with water.

12. The soil modifier according to claim 1, wherein the porous material has a particle diameter of 0.1 to 50.0 mm.

* * * * *